United States Patent
Islam et al.

(10) Patent No.: US 11,569,900 B2
(45) Date of Patent: Jan. 31, 2023

(54) BEAM CHANGING FOR A REPEATER NODE

(71) Applicant: QUALCOMM Incorporated, San Diego, CA (US)

(72) Inventors: Muhammad Nazmul Islam, Littleton, MA (US); Navid Abedini, Basking Ridge, NJ (US); Junyi Li, Franklin Park, NJ (US); Ori Shental, Marlboro, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/210,105

(22) Filed: Mar. 23, 2021

(65) Prior Publication Data
US 2022/0311503 A1   Sep. 29, 2022

(51) Int. Cl.
| | |
|---|---|
| *H04B 7/155* | (2006.01) |
| *H04B 7/06* | (2006.01) |
| *H04L 5/00* | (2006.01) |
| *H04L 27/26* | (2006.01) |
| *H04W 72/04* | (2009.01) |

(52) U.S. Cl.
CPC ......... *H04B 7/1555* (2013.01); *H04B 7/0695* (2013.01); *H04L 5/0098* (2013.01); *H04L 27/2666* (2013.01); *H04W 72/046* (2013.01)

(58) Field of Classification Search
CPC ............... H04B 7/1555; H04B 7/0695; H04L 5/0098; H04L 27/2666; H04W 72/046
See application file for complete search history.

(56) References Cited

U.S. PATENT DOCUMENTS

| | | | | |
|---|---|---|---|---|
| 2018/0131493 | A1* | 5/2018 | Luo | ........................ H04L 5/0007 |
| 2019/0158162 | A1* | 5/2019 | Ryu | ........................ H04B 7/088 |
| 2019/0260456 | A1  | 8/2019 | Zhou et al. | |
| 2019/0312619 | A1* | 10/2019 | Abedini | ............... H04B 17/382 |
| 2019/0394634 | A1* | 12/2019 | Akkarakaran | ........ H04W 88/06 |

(Continued)

OTHER PUBLICATIONS

International Search Report and Written Opinion—PCT/US2022/070789—ISA/EPO—dated Jun. 17, 2022 (2102071WO).

(Continued)

*Primary Examiner* — Kenneth T Lam
(74) *Attorney, Agent, or Firm* — Arun Swain; Norton Rose Fulbright LLP

(57) ABSTRACT

This disclosure provides systems, apparatus, methods, and computer-readable media for beam switching by a repeater node that forwards communications from one of a first node or a second node to the other of the first node or the second node. For example, after a change of position by the second node, the first node may provide the repeater node an instruction to perform a beam change operation to communicate with the second node. In some aspects, performing the beam change operation by the repeater node may improve reliability of wireless communications, such as by focusing signal energy in a particular direction. Further, a beam change delay time interval or a scheduling of the beam change delay time interval may be selected based on scheduling associated with other nodes, which may reduce a number of messages sent to the repeater node (such as by reducing instructions to change beam directions).

30 Claims, 6 Drawing Sheets

(56) References Cited

U.S. PATENT DOCUMENTS

| | | | |
|---|---|---|---|
| 2020/0280361 A1* | 9/2020 | Lyu | H04B 7/0695 |
| 2020/0322037 A1 | 10/2020 | Abedini et al. | |
| 2020/0351798 A1* | 11/2020 | Ji | H04W 52/42 |
| 2020/0374871 A1* | 11/2020 | Liu | H04B 7/15507 |
| 2020/0374960 A1* | 11/2020 | Deenoo | H04W 72/1284 |
| 2020/0403689 A1* | 12/2020 | Rofougaran | H04W 52/245 |
| 2020/0412519 A1* | 12/2020 | Krishnaswamy | H04L 5/1469 |
| 2021/0083759 A1* | 3/2021 | Hanson | H04B 7/15557 |
| 2021/0127389 A1* | 4/2021 | Liu | H04L 5/0087 |
| 2021/0211893 A1* | 7/2021 | Shao | H04W 72/046 |

OTHER PUBLICATIONS

Partial International Search Report—PCT/US2022/070789—ISA/EPO—dated Jun. 17, 2022 (2102071WO).

\* cited by examiner

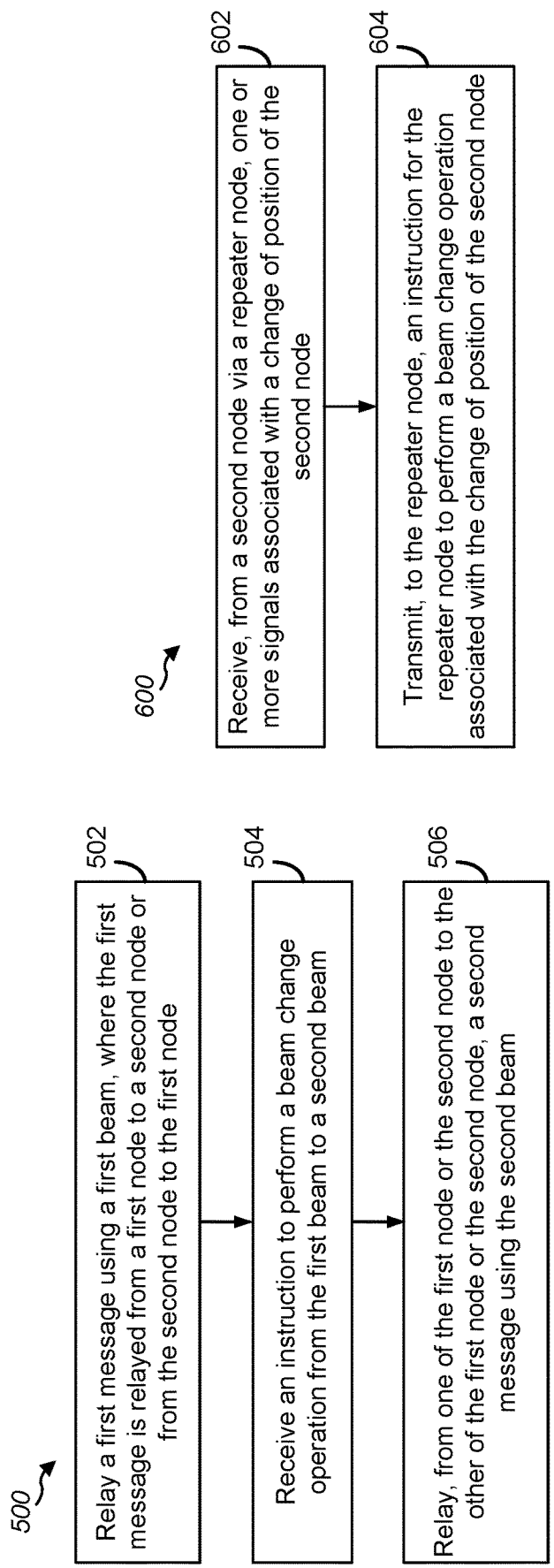

BEAM CHANGING FOR A REPEATER NODE

TECHNICAL FIELD

Aspects of the present disclosure relate generally to wireless communication systems, and more particularly, but without limitation, to wireless communication systems that include repeater nodes.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication performed by a repeater node. The method includes relaying a first message using a first beam. The first message is relayed from a first node to a second node or from the second node to the first node. The method further includes receiving an instruction to perform a beam change operation from the first beam to a second beam. The method further includes relaying, from one of the first node or the second node to the other of the first node or the second node, a second message using the second beam.

In some implementations, a beam change delay time interval associated with the beam change operation is associated with one or more of a first subcarrier spacing (SCS) of a first link associated with the repeater node and the first node, a second SCS of a second link associated with the repeater node and the second node prior to the beam change operation, or a third SCS of the second link after the beam change operation.

In some implementations, the first SCS is associated with a first beam change delay, the second SCS is associated with a second beam change delay, the third SCS is associated with a third beam change delay, and the beam change delay time interval is selected from among the first beam change delay, the second beam change delay, and the third beam change delay.

In some implementations, the method can include receiving a configuration message indicating a threshold beam change delay time interval associated with an SCS, where a beam change delay time interval associated with the beam change operation is less than or equal to the threshold beam change delay time interval.

In some implementations, the method can include transmitting a message indicating a beam change delay capability associated with the repeater node, and the threshold beam change delay time interval is associated with the beam change delay capability and with the SCS.

In some implementations, the threshold beam change delay time interval is based on a plurality of threshold beam change delay time intervals associated with a plurality of repeater nodes that includes the repeater node and at least one other repeater node.

In some implementations, the threshold beam change delay time interval is common to a plurality of repeater nodes that includes the repeater node and at least one other repeater node.

In some implementations, the method can include receiving a first downlink control information (DCI) message, receiving a second DCI message, and forwarding the second DCI message to the first node or the second node. The first DCI message indicates a first beam change delay time interval associated with the repeater node, the second DCI message indicates a second beam change delay time interval associated with the first node or the second node and that is less than the first beam change delay time interval, and the beam change operation is performed based on the first beam change delay time interval.

In some implementations, the first DCI message includes the instruction to perform the beam change operation.

In some implementations, the method can include transmitting a message indicating a beam change delay capability associated with the repeater node, where the beam change delay capability corresponds to a difference between the first beam change delay time interval and the second beam change delay time interval.

In some implementations, the instruction is of a dynamic scheduling type that indicates to perform the beam change operation dynamically.

In some implementations, the instruction is of a semi-static scheduling type that indicates to perform the beam change operation semi-statically.

In some implementations, the repeater node is in communication with multiple user equipments (UEs), and each UE of the multiple UEs is associated with one or both of a respective beam or a respective scheduling type.

In some implementations, the instruction indicates to perform the beam change operation semi-statically according to a scheduling pattern associated with the multiple UEs.

In some implementations, the instruction is included in a downlink control information (DCI) message, a medium access control (MAC) control element (MAC-CE), or a radio resource control (RRC) signal.

In some implementations, the method can include, during a beam change delay time interval associated with the beam change operation, communicating using the first beam.

In some implementations, the method can include, during a beam change delay time interval associated with the beam change operation, buffering one or more messages from one of the first node or the second node, and after performing the beam change operation, transmitting the one or more messages to the other of the first node or the second node using the second beam.

In some implementations, the repeater node is included in a multi-hop network that includes at least a second repeater node, and a first beam change delay time interval associated with the repeater node is different than a second beam change delay time interval associated with the second repeater node.

In some implementations, the repeater node is included in a multi-hop network that includes at least a second repeater node, and a first scheduling associated with the repeater node is different than a second scheduling associated with the second repeater node.

In some implementations, the first scheduling is one of a periodic type or a semi-static type, and the second scheduling is one of the periodic type or the semi-static type.

In some implementations, the first scheduling is applied to first downlink transmit beams or first uplink receive beams associated with the repeater node, and the second scheduling is applied to second downlink transmit beams or second uplink receive beams associated with the second repeater node.

Another innovative aspect of the subject matter described in this disclosure can be implemented in a repeater node for wireless communication. The repeater node includes a transmitter and a receiver configured to receive an instruction to perform a beam change operation from a first beam to a second beam. One or more of the transmitter or the receiver are configured to relay a first message using the first beam from a first node to a second node or from the second node to the first node and are further configured to relay, from one of the first node or the second node to the other of the first node or the second node, a second message using the second beam.

In some implementations, the repeater node and the first node are associated with a first link, and the first link corresponds to an access link or a fronthaul link.

In some implementations, the repeater node and the second node are associated with a second link, and the second link corresponds to a fronthaul link or an access link.

In some implementations, the first node corresponds to at least one of a user equipment (UE), a repeater node, a distributed unit (DU), a base station, a parent node, or a central unit (CU).

In some implementations, the second node corresponds to at least one of a UE, a repeater node, a DU, a base station, a parent node, or a CU.

Another innovative aspect of the subject matter described in this disclosure can be implemented in a method for wireless communication by a first node. The method includes receiving, from a second node via a repeater node, one or more signals associated with a change of position of the second node. The method further includes transmitting, to the repeater node, an instruction for the repeater node to perform a beam change operation associated with the change of position of the second node.

In some implementations, the instruction is of one of a dynamic scheduling type that indicates to perform the beam change operation dynamically or a semi-static scheduling type that indicates to perform the beam change operation semi-statically.

Another innovative aspect of the subject matter described in this disclosure can be implemented in an apparatus for wireless communication. The apparatus includes a receiver configured to receive, via a repeater node from a second node, one or more signals associated with a change of position of the second node. The apparatus further includes a transmitter configured to transmit, to the repeater node, an instruction for the repeater node to perform a beam change operation associated with the change of position of the second node.

In some aspects, the instruction is of one of a dynamic scheduling type that indicates to perform the beam change operation dynamically or a semi-static scheduling type that indicates to perform the beam change operation semi-statically.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 5 is a flow diagram illustrating an example process of wireless communication performed by a repeater node.

FIG. 6 is a flow diagram illustrating an example process of wireless communication performed by a base station.

Like reference numbers and designations in the various drawings indicate like elements.

DETAILED DESCRIPTION

Figure 1:
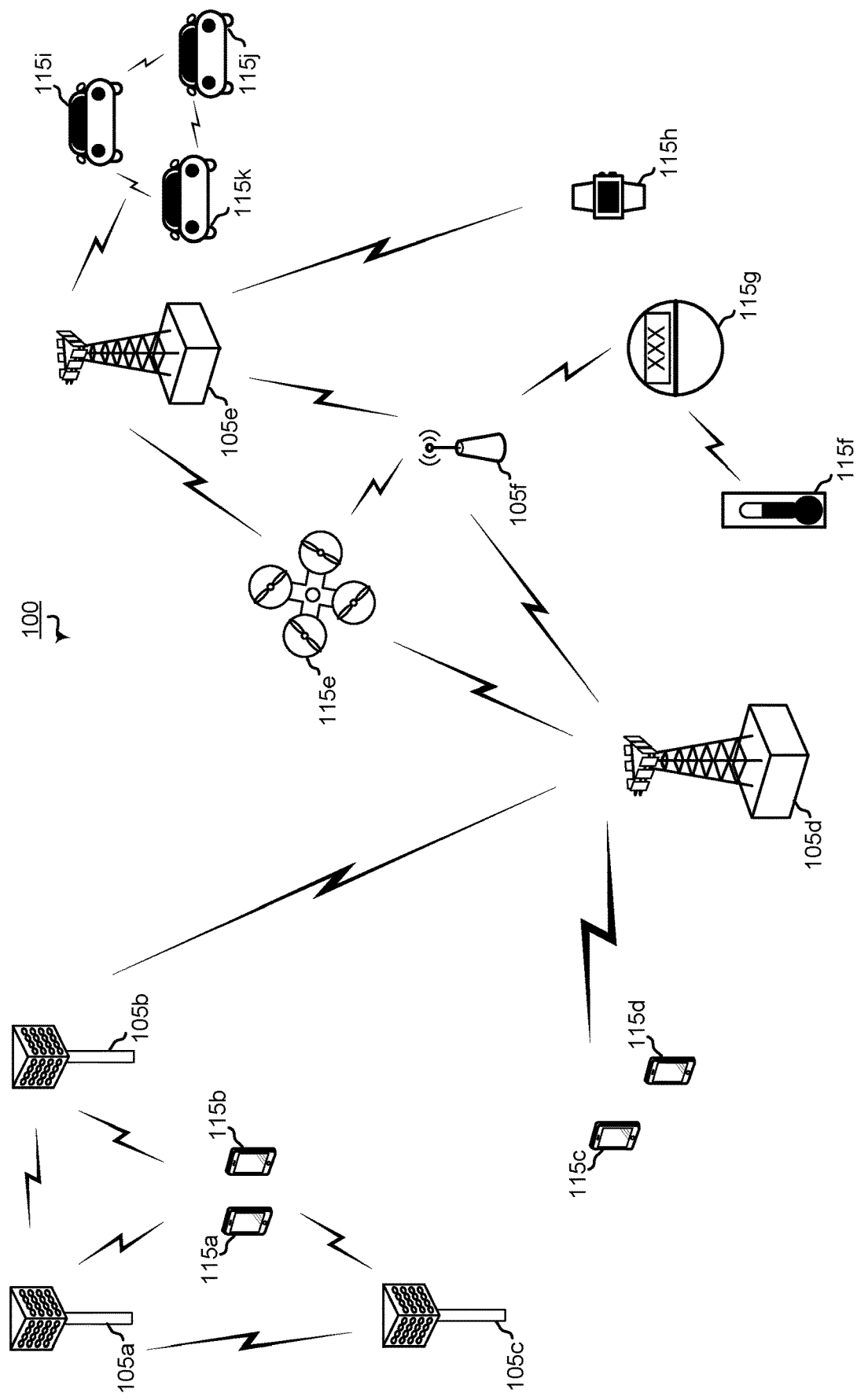
FIG. 1 is a block diagram illustrating an example wireless communication system.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio ('TETRA), Wideband-CDMA (W-CDMA), Evolution Data Optimized (EV-DO), NEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Some wireless communication systems use "intermediate" devices that forward messages and signals from one device to another device. Use of such an intermediate device may increase a communication range of devices. In some cases, implementation of an intermediate device may be difficult due to the variety of different wireless communication technologies (such as different wireless communication protocols) that may be used by devices in communication with the intermediate device. For example, some devices may transmit and receive signals having different directions.

For example, some wireless communication systems use beams to focus signal energy in one or more directions. To illustrate, a base station may use an antenna array to focus transmitted signals toward a UE, and the UE may use an antenna array to focus energy of transmitted signals toward the base station. In some cases, a distance between devices may exceed a range associated with beams, which may result in dropped communications and service interruptions. Further, in some cases, a position or location of the UE may change, in which case the antenna arrays may transmit or focus signals in the "wrong" direction in some cases.

The present disclosure provides systems, apparatus, methods, and computer-readable media for beam switching by a repeater node that forwards communications from one of a first node or a second node to the other of the first node or the second node. For example, after a change of position by the second node, the first node may provide the repeater node an instruction to perform a beam change operation from a first beam to a second beam to communicate with the second node.

In some implementations, the beam change operation is associated with a beam change delay time interval, such as a "maximum" time (or number of slots) between detecting a beam change trigger condition (such as receiving the instruction) and performing the beam change operation. In an illustrative example, the beam change delay time interval may be based on one or more of a first subcarrier spacing (SCS) of a first link between the repeater node and the first node, a second SCS of a second link between the repeater node and the second node prior to the beam change operation, or a third SCS of the second link after the beam change operation. Alternatively, or in addition, the beam change delay time interval may be based on beam change delay time intervals associated with one or more nodes, such as the second node.

Further, the beam change delay time interval may be changed based on a schedule, such as based on a semi-static schedule or based on a periodic schedule. As an illustrative example, the repeater node may communicate with multiple nodes (such as multiple UEs) based on a schedule (such as a semi-static or periodic schedule), and the beam change operation may be performed according to the schedule to facilitate communication with the multiple nodes.

Particular implementations of the subject matter described in this disclosure can be implemented to realize one or more of the following potential advantages. In some aspects, performing a beam change operation by a repeater node may improve reliability of wireless communications, such as by focusing signal energy in a particular direction, which may enhance reliability of wireless communications as compared to isotopically relaying messages between nodes. Further, a beam change delay time interval or a scheduling of the beam change delay time interval may be selected based on scheduling associated with other nodes, which may facilitate enhanced wireless communication (such as by enabling directional communication with multiple nodes) while reducing a number of messages sent to the repeater node (such as by reducing or eliminating the use of multiple instructions to change between beam directions). In some cases, performing the beam change operation by the repeater node may reduce interference in a wireless communication system. For example, by focusing signals transmitted by a repeater node to a UE (instead of isotopically transmitting the signals), other UEs may detect less interference from the signals, improving signal quality for the other UEs.

5G networks contemplate diverse deployments, diverse spectrum, and diverse services and devices that may be implemented using an OFDM-based unified, air interface. To achieve these goals, further enhancements to LT E and LTE-A are considered in addition to development of the new radio technology for 5G NR networks. The 5G NR will be capable of scaling to provide coverage (1) to a massive Internet of things (IoTs) with an ultra-high density (such as ~1 M nodes/km$^2$), ultra-low complexity (such as ~10 s of bits/sec), ultra-low energy (such as ~10+ years of battery life), and deep coverage with the capability to reach challenging locations; (2) including mission-critical control with strong security to safeguard sensitive personal, financial, or classified information, ultra-high reliability (such as 99.9999% reliability), ultra-low latency (such as ~1 millisecond (ms)), and users with wide ranges of mobility or lack thereof; and (3) with enhanced mobile broadband including extreme high capacity (such as ~10 Tbps/km$^2$), extreme data rates (such as multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device to device or peer to peer or ad hoc network arrangements, etc.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105$d$ and 105$e$ are regular macro base stations, while base stations 105$a$-105$c$ are macro base stations enabled with one of 3 dimension (3D), full dimension (FD), or massive MIMO. Base stations 105$a$-105$c$ take advantage of their higher dimension MIMO capabilities to exploit 3D beamforming in both elevation and azimuth beamforming to increase coverage and capacity. Base station 105$f$ is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (such as MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is reported to the network through the small cell base station 105f. The 5G network 100 may provide additional network efficiency through dynamic, low-latency TDD/FDD communications, such as in a vehicle-to-vehicle (V2V) mesh network between the UEs 115i-115k communicating with the macro base station 105e.

Figure 2:
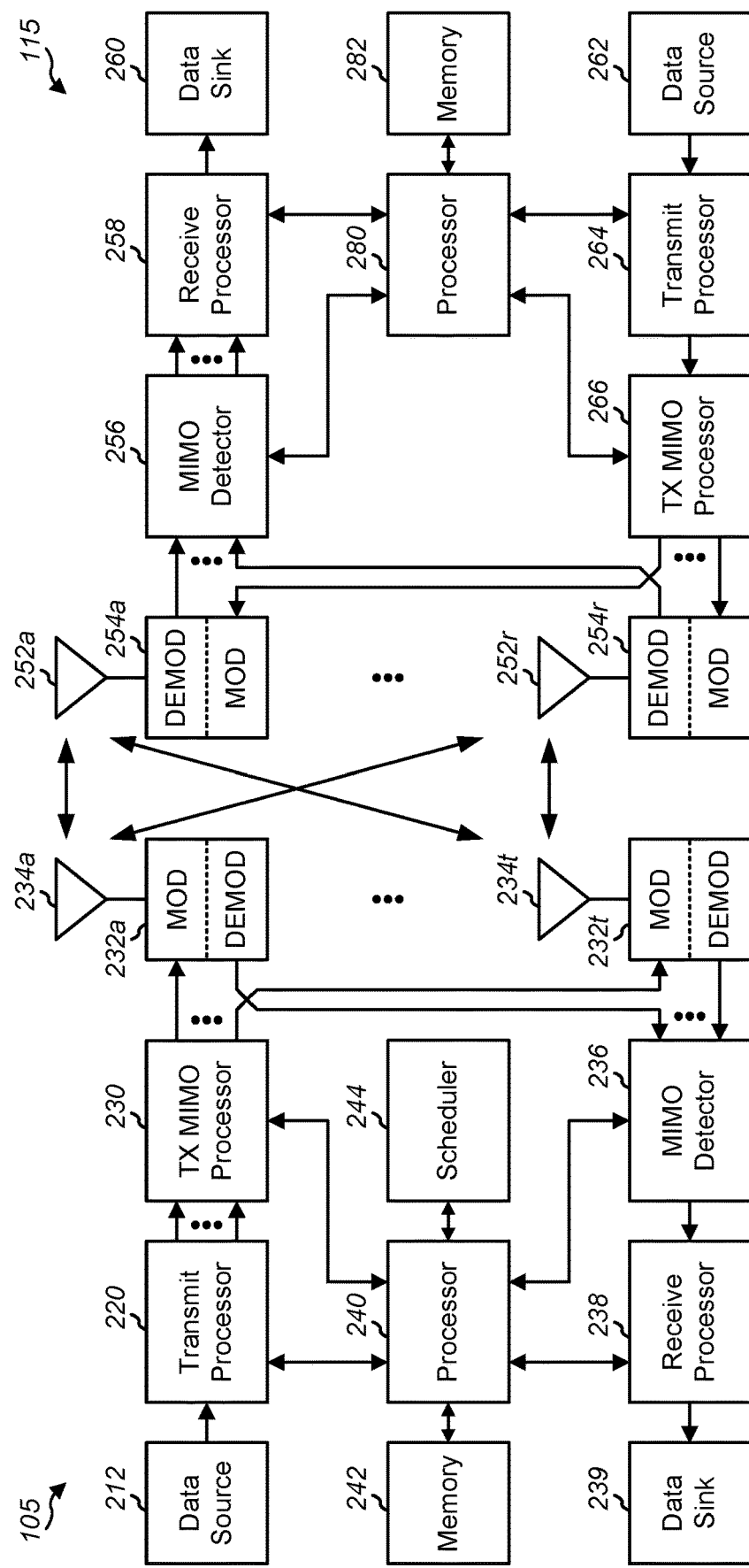
FIG. 2 is a block diagram illustrating examples of a base station (BS) and a user equipment (UE).

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, etc., to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal.

Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, etc., to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a processor 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the processor 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, etc.), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the processor 240.

The processors 240 and 280 may direct the operation at the base station 105 and the UE 115, respectively. The processor 240 or other processors and modules at the base station 105 or the processor 280 or other processors and modules at the UE 115 may perform or direct the execution of various processes for the techniques described herein, such as to perform or direct the execution illustrated in FIGS. 5 and 6, or other processes for the techniques described herein. The memories 242 and 282 may store data and program codes for the base station 105 and The UE 115, respectively. The scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge/negative-acknowledge (ACK/NACK) feedback for its own transmitted packets as a proxy for collisions.

Figure 3:
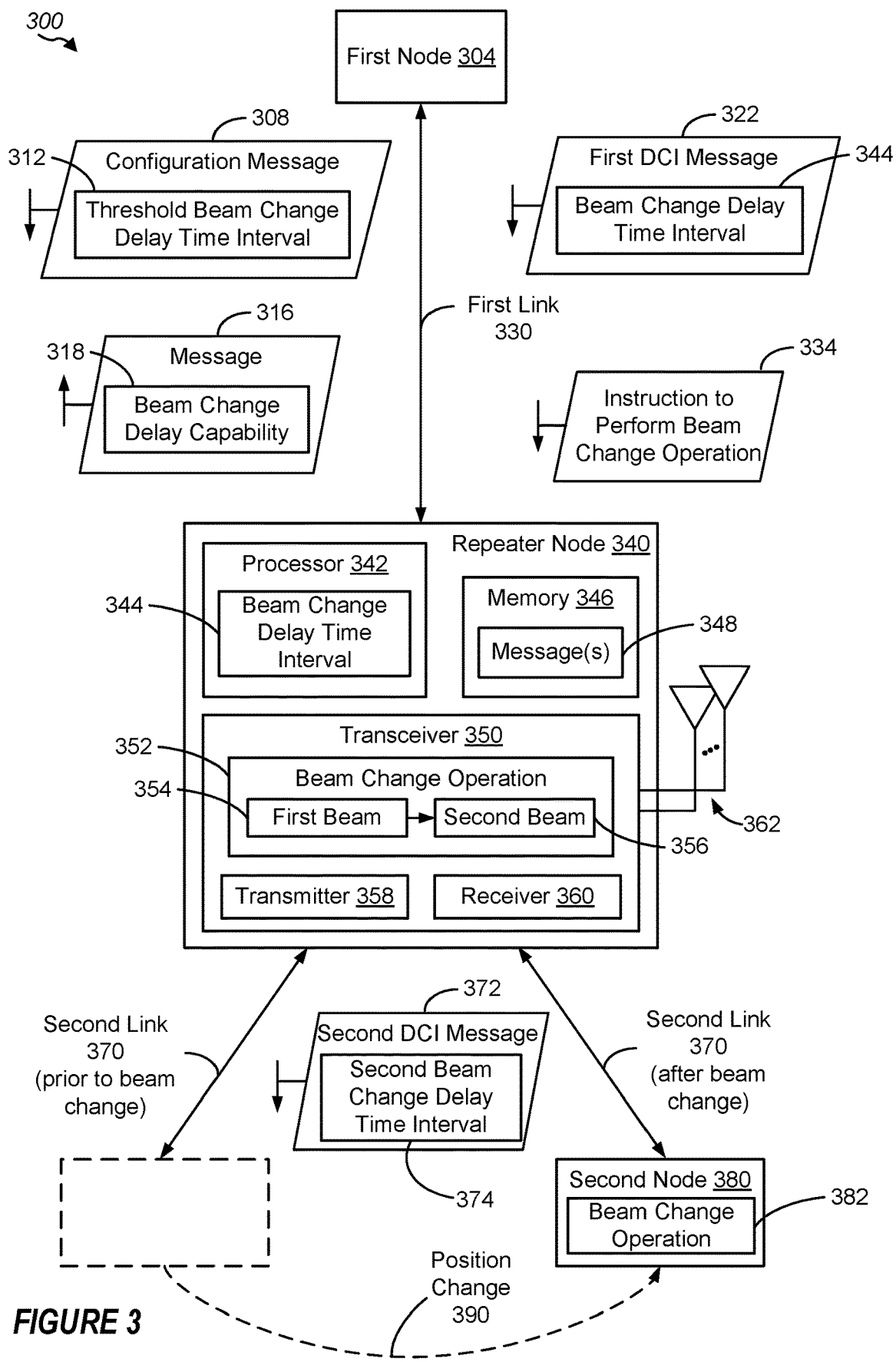
FIG. 3 is a block diagram of an example of a communication system.

FIG. 3 is a block diagram of an example of a communication system 300. The communication system 300 may include one or more first nodes (such as a first node 304), one or more repeater nodes (such as a repeater node 340), and one or more second nodes, such as a second node 380. In some examples, the first node 304 corresponds to at least one of a UE, a transmission and reception point (TRP), a repeater, a distributed unit (DU), a base station, a parent node, or a central unit (CU), and the second node 380 corresponds to at least one of a UE, a TRP, a repeater, a DU, a base station, a parent node, or a CU. To further illustrate, in a non-limiting illustrative example, the first node 304 may correspond to the base station 105, and the second node 380 may correspond to the UE 115.

The repeater node 340 may communicate with the first node 304 via a first link 330 (such as a first wireless communication channel) and may communicate with the second node 380 via a second link 370 (such as a second wireless communication channel). The first link 330 may correspond to an access link or a fronthaul link, and the second link 370 may correspond to an access link or a fronthaul link. To further illustrate, in a non-limiting illustrative example, the first node 304 and the second node 380 may respectively correspond to the base station 105 and the UE 115, and the first link 330 and the second link 370 may respectively correspond to a fronthaul link and an access link.

Each node illustrated in FIG. 3 may include components such as a processor, a memory, a transmitter, a receiver, a transceiver, and one or more antennas, as illustrative examples. For example, the repeater node 340 includes one or more processors (such as a processor 342), a memory 346, and a transceiver 350. The transceiver 350 may include a transmitter 358 and a receiver 360. The transceiver 350 may be coupled to or may include one or more antennas, such as an antenna array 362.

The antenna array 362 may include multiple antenna elements configured to perform wireless communications with other devices, such as with the first node 304, the second node 380, or both. In some implementations, the antenna array 362 may be configured to perform wireless communications using different beams, also referred to as antenna beams. The beams may include transmit beams and receive beams. To illustrate, the antenna array 362 may include multiple independent sets (or subsets) of antenna elements (or multiple individual antenna arrays), and each set of antenna elements of the antenna array 362 may be configured to communicate using a different respective beam that may have a different respective direction than the other beams. For example, a first set of antenna elements of the antenna array 362 may be configured to communicate via a first beam 354 having a first direction, and a second set of antenna elements of the antenna array 362 may be configured to communicate via a second beam 356 having a second direction. In some other implementations, the antenna array 362 may be configured to communicate via more than two beams. Alternatively, one or more sets of antenna elements of the antenna array 362 may be configured to concurrently generate multiple beams, for example using multiple RF chains of the repeater node 340. Each individual set (or subset) of antenna elements may include multiple antenna elements, such as two antenna elements, four antenna elements, ten antenna elements, twenty antenna elements, or any other number of antenna elements greater than two. Although described as an antenna array, in some other implementations, the antenna array 362 may include or correspond to multiple antenna panels, and each antenna panel may be configured to communicate using a different respective beam.

During operation, the second node 380 may experience a position change 390. For example, the second node 380 may correspond to a portable electronic device that is carried by a user from a first location to a second location. As another example, the second node 380 may correspond to a sensor device (such as an Internet-of-things (IoT) sensor device) that may be moved from a first location to a second location. In some examples, the first node may detect the position change 390 based on communications transmitted between the first node 304 and the second node 380 via the repeater node 340. As an illustrative example, the first node 304 may periodically transmit, via the repeater node 340, multiple beams each associated with a respective beam direction. The second node 380 may select one or more beams of the multiple beams (such as by "sweeping" the multiple beams to detect a beam associated with one or more parameters greater than a threshold) and may transmit an indication of the selected one or more beams to the first node 304 via the repeater node 340. Examples of the one or more parameters may include a received signal strength parameter, a reference signal received power (RSRP) parameter, or a signal-to-noise-plus-interference ratio (SINR) parameter, as illustrative examples. To further illustrate, the first node 304 may transmit one or more reference signals to the second node 380, and the second node 380 may determine the one or more parameters based on the one or more reference signals. The second node 380 may transmit a report indicating the one or more parameters, and the first node 304 may select a beam for the second node 380 based on the report.

To facilitate beam changes between the first node 304 and the second node 380, the repeater node 340 may perform a beam change operation 352. For example, prior to the position change 390, the repeater node 340 may communicate with the second node 380 using the first beam 354. Communicating with the second node 380 using the first beam 354 may include receiving a first message from one of the first node 304 or the second node 380 and relaying the first message to the other of the first node 304 or the second node 380. After the position change 390, the repeater node 340 may perform a beam change operation 352 from the first beam 354 to the second beam 356. After performing the beam change operation 352, the repeater node 340 may communicate with the second node 380 using the second beam 356. Communicating with the second node 380 using the second beam 356 may include receiving a second message from one of the first node 304 or the second node 380 and relaying the second message to the other of the first node 304 or the second node 380. In some examples, the first beam 354 and the second beam 356 may correspond to uplink transmit beams, downlink transmit beams, uplink receive beams, downlink receive beams, sidelink transmit beams, sidelink receive beams, or other beams. Further, although the beam change operation 352 may be described with respect to the second node 380, in some implementations, the repeater node 340 may perform a beam change operation 352 with respect to the first node 304 (alternatively or in addition to the second node 380).

In a first example, the first node 304 may provide an instruction 334 to the repeater node 340 to perform the beam change operation 352. For example, the first node 304 may provide the instruction 334 to the repeater node 340 in response to detecting the position change 390 based on one or more signals transmitted by the second node 380 to the first node 304 via the repeater node 340.

The instruction 334 may be associated with a scheduling type. In some examples, the instruction 334 is of a dynamic scheduling type that indicates that the repeater node 340 is to perform the beam change operation 352 dynamically. In some other examples, the instruction 334 is of a semi-static scheduling type that indicates that the repeater node 340 is to perform the beam change operation 352 semi-statically. To further illustrate, the repeater node 340 may be in communication with multiple second nodes 380, such as multiple UEs. Each UE of the multiple UEs may be associated with one or both of a respective beam or a respective scheduling type. The instruction 334 may indicate that the repeater node 340 is to perform the beam change operation 352 semi-statically according to a scheduling pattern associated with the multiple UEs, which may enable the repeater node 340 to switch between one beam to communicate with a first UE (at times when the first UE is scheduled for communication) and another beam to communicate with a second UE (at times when the second UE is scheduled for communication).

Alternatively, or in addition to the first example, in a second example, the repeater node 340 may be associated with a beam change delay time interval 344 that is associated with the beam change operation 352. The beam change delay time interval 344 may correspond to "maximum" time (or number of slots) to complete the beam change operation 352, such as a "maximum" time (or number of slots) between detecting a beam change trigger condition (such as receiving the instruction 334) and performing the beam change operation 352.

The beam change delay time interval 344 may correspond to a number of slots that is associated with (or based on) a subcarrier spacing (SCS) (such as if a certain time duration may correspond to different numbers of slots for different SCSs due to different symbol durations for the different SCSs). For example, the beam change delay time interval 344 may be associated with (or based on) one or more of a first SCS of the first link 330, a second SCS of the second link 370 prior to the beam change operation 352, or a third SCS of the second link 370 after the beam change operation 352. In some implementations, the first SCS is associated with a first beam change delay, the second SCS is associated with a second beam change delay, the third SCS is associated with a third beam change delay, and the beam change delay time interval 344 is selected from among the first beam change delay, the second beam change delay, and the third beam change delay (such as by selecting the maximum or "worst case" beam change delay). To further illustrate, some wireless communication protocols may specify that a device is to complete a beam change operation within a time interval that is based on an SCS of a link. As an illustrative example, a wireless communication protocol may specify that, in response to the position change 390, the second node 380 is to complete a beam change operation 382 within a time interval that is based on a SCS of the first link 330 or the second link 370.

In some examples, during the beam change delay time interval 344, the repeater node 340 may continue to communicate with the second node 380 using the first beam 354. For example, a wireless communication protocol may specify that the repeater node 340 is to continue communicating with the second node 380 using the first beam 354 until completing the beam change operation 352, at which time the repeater node 340 is to communicate with the second node 380 using the second beam 356. In some other examples, the repeater node 340 may pause one or more communications with the second node 380 during the beam change delay time interval 344 and may resume the one or more communications in response to expiration of the beam change delay time interval 344. To illustrate, a wireless communication protocol may specify that the repeater node 340 is to buffer one or more messages 348 received from one of the first node 304 or the second node 380 during the beam change delay time interval 344 and that the repeater node 340 is to transmit the one or more messages 348 to the other of the first node 304 or the second node 380 after performing the beam change operation 352.

Alternatively, or in addition to one or more of the first and second examples, in a third example, the first node 304 may configure the repeater node 340 with the beam change delay time interval 344 (or with a range of beam change delay time intervals from which the repeater node 340 selects the beam change delay time interval 344) based on a beam change delay capability 318 of the repeater node 340. The beam change delay capability 318 may correspond to a threshold time (or number of slots) for the repeater node 340 to perform the beam change operation 352.

To illustrate, the first node 304 may provide a configuration message 308 indicating a threshold beam change delay time interval 312 to the repeater node 340. The threshold beam change delay time interval 312 may be associated with an SCS, such as an SCS of the first link 330 or an SCS of the second link 370. The configuration message 308 may indicate that the beam change delay time interval 344 is to be less than or equal to the threshold beam change delay time interval 312. In some examples, the first node 304 determines the threshold beam change delay time interval 312 based on the beam change delay capability 318 of the repeater node 340 (such as a hardware capability associated with the transceiver 350 indicating a minimum switching time to perform the beam change operation 352). For example, the repeater node 340 may transmit a message 316 indicating the beam change delay capability 318, and the first node 304 may determine the threshold beam change delay time interval 312 based on the beam change delay capability 318 (such as by selecting a beam change delay capability 318 that is greater than or equal to the beam change delay capability 318).

In some implementations, the beam change delay time interval 344 corresponds to the repeater node 340, such as if the beam change delay time interval 344 is based on a particular hardware configuration of the repeater node 340. In this case, each repeater node 340 of the communication system 300 may be associated with a respective the beam change delay time interval for a particular SCS. In some other implementations, a wireless communication protocol may specify that, for a particular SCS, each repeater node of the communication system 300 is to be associated with a common beam change delay time interval 344. In this case, the beam change delay time interval 344 may be common to multiple repeater nodes (including the repeater node 340 and at least one other repeater node). The common beam change delay time interval 344 may be based on respective beam change delay capabilities of the repeater nodes. As an illustrative example, the first node 304 may determine the common beam change delay time interval 344 by selecting the "minimum" beam change delay capability from among the beam change delay capabilities of the multiple repeater nodes. As a non-limiting illustrative example, a wireless communication protocol may specify that a UE beam switching delay may be selected from 7, 14, or 28 slots for a 60 kilohertz (kHz) SCS and may be selected from 14 or 28 slots for a 120 kHz SCS. In this illustrative example, the first node 304 may select 7 slots as the common beam change delay time interval 344 for a 60 kHz SCS and may select 14 slots as the common beam change delay time interval 344 for a 120 kHz SCS.

Alternatively, or in addition to one or more of the first through third examples, in a fourth example, the beam change delay time interval 344 may correspond to a "relaxed" version of a beam change delay time interval associated with the second node 380. For example, because the repeater node 340 may receive messages from the first node 304 in advance of the second node 380 (such as if the repeater node 340 is "upstream" of the second node 380), the repeater node 340 may be allocated more time to perform the beam change operation 352 than the second node 380 is allocated to perform the beam change operation 382.

To illustrate, the first node 304 may transmit a first downlink control information (DCI) message 322 to the repeater node 340 indicating a first beam change delay time interval (such as the beam change delay time interval 344) associated with the repeater node 340. The first node 304 may transmit a second DCI message 372 to the repeater node 340, and the repeater node 340 may relay the second DCI message 372 to the second node 380. The second DCI message 372 may indicate a second beam change delay time interval 374 associated with the second node 380, such as a time (or number of slots) by which the second node 380 is to complete the beam change operation 382. The second beam change delay time interval 374 may be less than the beam change delay time interval 344.

To further illustrate, the second node 380 may receive the second DCI message 372 during slot n (where n indicates a positive integer), and the second DCI message 372 may indicate that the second node 380 is to complete the beam change operation by slot n+M (where M indicates a positive integer). The repeater node 340 may receive the first DCI message 322 during a slot n−L (where L indicates a positive integer). In this example, the beam change delay time interval 344 may correspond to L+M slots, and the second beam change delay time interval 374 may correspond to M slots. In some examples, the first DCI message 322 includes the instruction 334 to perform the beam change operation 352. In some examples, the first node 304 determines the difference between the beam change delay time interval 344 and the second beam change delay time interval 374 (where the difference may correspond to L slots) based on the beam change delay capability 318. For example, the beam change delay capability 318 may correspond to the difference between the beam change delay time interval 344 and the second beam change delay time interval 374 (such as L slots).

In some examples, one or more messages described herein may be included in a DCI message, a medium access control (MAC) control element (MAC-CE), a radio resource control (RRC) signal, or another signal. As an illustrative example, the instruction 334 may be included in a DCI message, a MAC-CE, or an RRC signal.

Although the example of FIG. 3 illustrates that the communication system 300 may include a single repeater node 340, in some other implementations, a communication system may include multiple repeater nodes.

Figure 4:
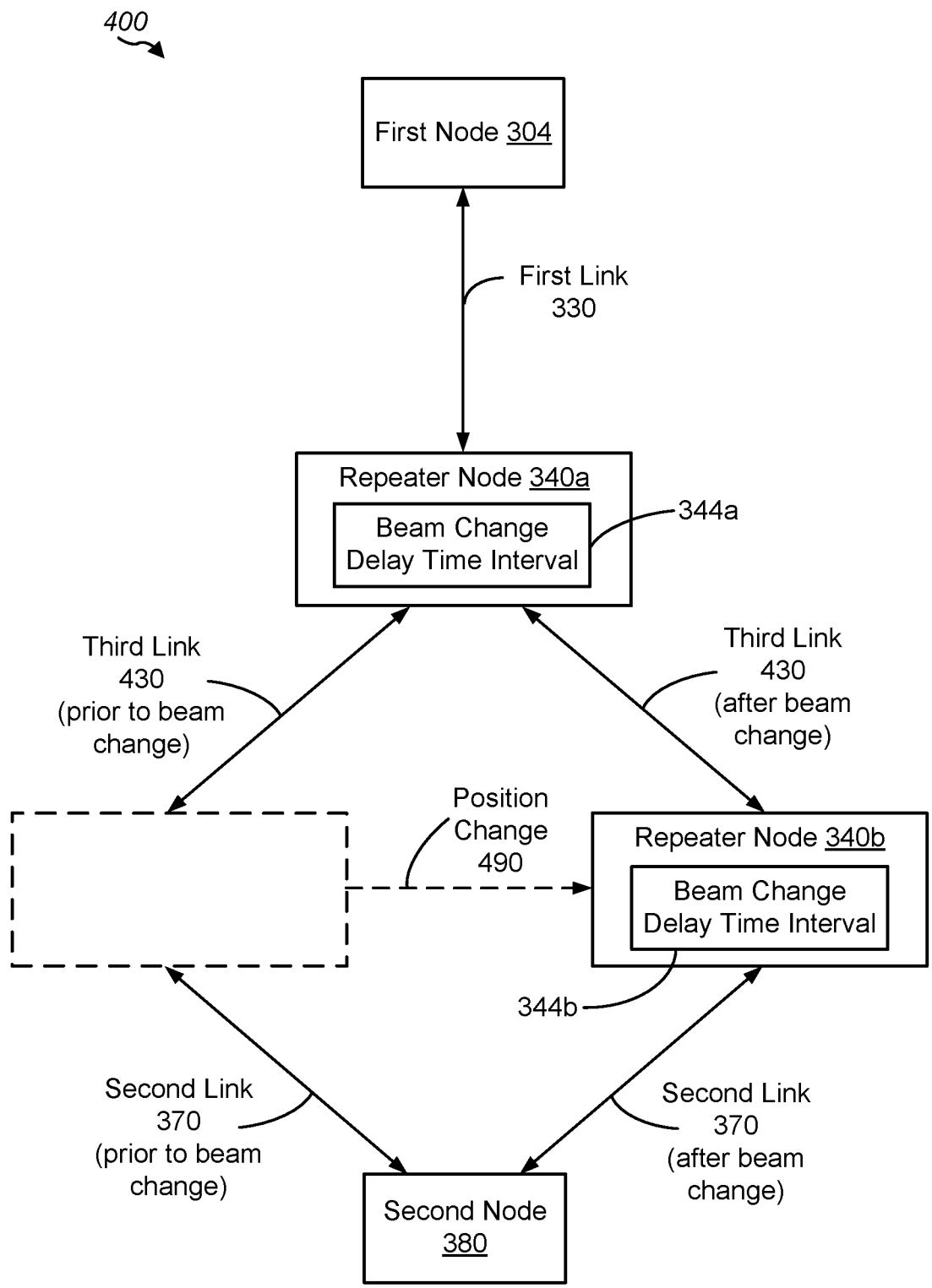
FIG. 4 is a block diagram illustrating an example of a communication system including a multi-hop network.

FIG. 4 is a block diagram illustrating an example of a communication system 400 including a multi-hop network. The multi-hop network may include a first repeater node 340a and at least a second repeater node 340b. The first repeater node 340a may communicate with the second repeater node 340b via a third link 430. The communication system 400 may further include the first node 304 and the second node 380.

During operation, the repeater nodes 340a-b may relay communications from the first node 304 to the second node 380, from the second node 380 to the first node 304, or both. In some cases, the second repeater node 340b may experience a position change 490. For example, the second repeater node 340b may correspond to a portable electronic device that is carried by a user from a first location to a second location. As another example, the second repeater node 340b may correspond to a sensor device (such as an IoT sensor device) that may be moved from a first location to a second location. Based on the position change 490, the first repeater node 340a, the second repeater node 340b, and the second node 380 may perform beam change operations associated with respective beam change operation delay time intervals. For example, the first repeater node 340a may perform a first beam change operation associated with a first beam change delay time interval 344a, and the second repeater node 340b may perform a second beam change operation associated with a second beam change delay time interval 344b.

In some examples, the first beam change delay time interval 344a associated with the first repeater node 340a may be different than (such as more "relaxed" than) the second beam change delay time interval 344b associated with the second repeater node 340b. For example, because the first repeater node 340a may receive messages from the first node 304 in advance of the second repeater node 340b (such as if the first repeater node 340a is "upstream" of the second repeater node 340b), the first repeater node 340a may be allocated more time to perform a beam change operation as compared to the second repeater node 340b. To further illustrate, the second node 380 may be allocated M slots to perform a beam change operation, the second repeater node 340b may be allocated M+L slots to perform a beam change operation, and the first repeater node 340a may be allocated M+L+K slots to perform a beam change operation (where K indicates a positive integer).

Alternatively, or in addition, a first scheduling associated with the first repeater node 340a may be different than a second scheduling associated with the second repeater node 340b. To illustrate, the first scheduling may be one of a periodic type or a semi-static type, and the second scheduling may be one of the periodic type or the semi-static type. The first scheduling may be applied to first downlink transmit beams or first uplink receive beams associated with the first repeater node 340a, and the second scheduling may be applied to second downlink transmit beams or second uplink receive beams associated with the second repeater node 340b.

One or more aspects described herein may improve performance of a wireless communication system. For example, by performing the beam change operation 352, the repeater node 340 may improve reliability of wireless communications, such as by focusing signal energy in a particular direction of the second node 380, which may enhance reliability of wireless communications as compared to isotopically relaying messages between the nodes 304, 380. Further, the beam change delay time interval 344 or a scheduling of the beam change delay time interval 344 may be selected based on scheduling associated with other nodes, which may facilitate enhanced wireless communication (such as by enabling directional communication with the multiple nodes) while reducing a number of messages sent to the repeater node 340 (such as by reducing or eliminating the use of multiple instructions to change between beam directions). In some cases, performing the beam change operation 352 may reduce interference in a wireless communication system. For example, by focusing signals transmitted by the repeater node 340 to the second node 380 (instead of isotopically transmitting the signals), other devices may detect less interference from the signals, improving signal quality for the other devices.

Referring to FIG. 5, a flow diagram illustrating an example process 500 of operations for communication by a repeater node is shown. In some implementations, the process 500 may be performed by the repeater node 340. In some other implementations, the process 500 may be performed by an apparatus configured for wireless communication. For example, the apparatus may include at least one processor, and a memory coupled to the processor. The processor may be configured to perform operations of the process 500. In some other implementations, the process 500 may be performed or executed using a non-transitory computer-readable medium having program code recorded thereon. The program code may be program code executable by a computer for causing the computer to perform operations of the process 500.

As illustrated at block 502, a repeater node may relay a first message using a first beam. The first message is relayed from a first node to a second node or from the second node to the first node. For example, the first message may be included in the one or more messages 348, and the repeater node 340 may relay the message using the first beam 354. In some examples, relaying the first message includes receiving the first message from the first node 304 and transmitting the first message to the second node 380. In some other examples, relaying the first message includes receiving the first message from the second node 380 and transmitting the first message to the first node 304.

As illustrated at block 504, the repeater node may receive an instruction to perform a beam change operation from the first beam to a second beam. For example, the repeater node 340 may receive the instruction 334 to perform the beam change operation 352 from the first beam 354 to the second beam 356.

As illustrated at block 506, the repeater node may relay, from one of the first node or the second node to the other of the first node or the second node, a second message using the second beam. For example, the repeater node 340 may relay, from one of the first node 304 or the second node 380 to the other of the first node 304 or the second node 380, the second message using the second beam 356. In some examples, the second message is included in the one or more messages 348.

Referring to FIG. 6, a flow diagram illustrating an example process 600 of operations for communication by a first node is shown. In some implementations, the process 600 may be performed by the first node 304. In some other implementations, the process 600 may be performed by an apparatus configured for wireless communication. For example, the apparatus may include at least one processor, and a memory coupled to the processor. The processor may be configured to perform operations of the process 600. In some other implementations, the process 600 may be performed or executed using a non-transitory computer-readable medium having program code recorded thereon. The program code may be program code executable by a computer for causing the computer to perform operations of the process 600.

As illustrated at block 602, the first node may receive, from a second node via a repeater node, one or more signals associated with a change of position of the second node. For example, the one or more signals may include or correspond to a report generated by the second node 380 based on a beam sweep operation after the position change 390. The first node 304 may receive the one or more signals from the second node 380 via the repeater node 340.

As illustrated at block 604, the first node may transmit, to the repeater node, an instruction for the repeater node to perform a beam change operation associated with the change of position of the second node. For example, the first node 304 may transmit the instruction 334 to perform the beam change operation 352 from the first beam to the second beam 356.

Figure 7:
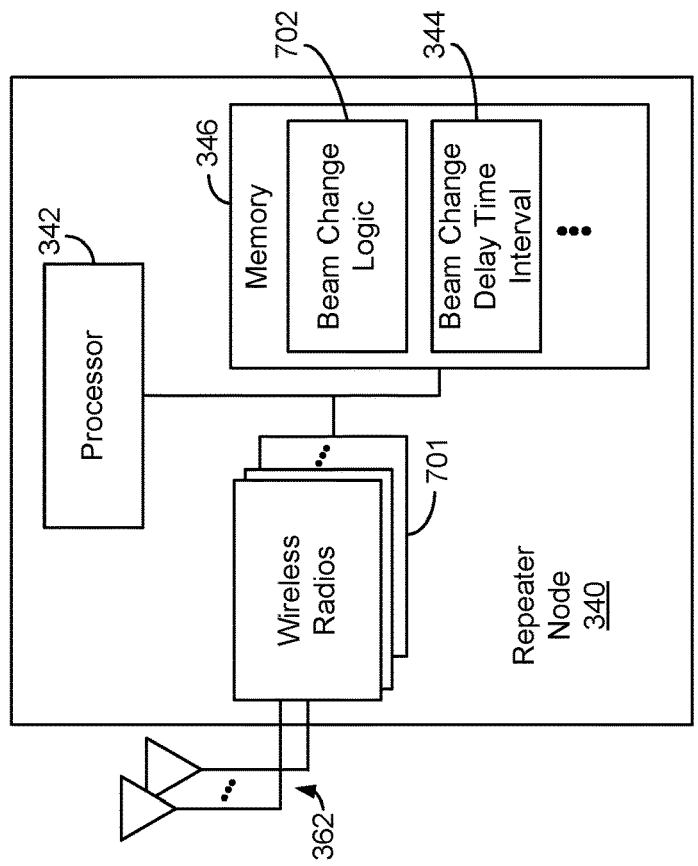
FIG. 7 is a block diagram illustrating an example of a repeater node.

FIG. 7 is a block diagram illustrating an example of the repeater node 340. The repeater node 340 may include structure, hardware, and components illustrated in FIG. 3. For example, the repeater node 340 may include the processor 342, which may execute instructions stored in the memory 346. Under control of the processor 342, the repeater node 340 may transmit and receive signals via wireless radios 701 and the antenna array 362. The wireless radios 701 may include one or more components or devices described herein, such as the transceiver 350, the transmitter 358, the receiver 360, one or more other components, or a combination thereof.

The memory 346 may store instructions executable by the processor 342 to initiate, perform, or control one or more operations described herein. For example, the memory 346 may store beam change logic 702 executable by the processor 342 to initiate, perform, or control the beam change operation 352. In some implementations, the memory 346 may store an indication of the beam change delay time interval 344 that may be associated with the beam change operation 352.

Figure 8:
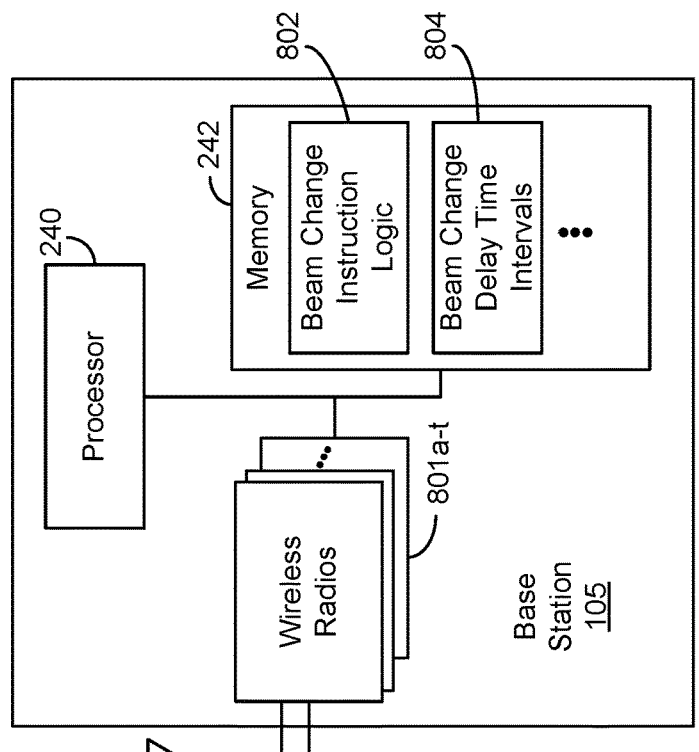
FIG. 8 is a block diagram illustrating an example of a base station.

FIG. 8 is a block diagram illustrating an example of the base station 105. The base station 105 may include structure, hardware, and components illustrated in FIG. 2. For example, the base station 105 may include the processor 240, which may execute instructions stored in the memory 242. Under control of the processor 240, the base station 105 may transmit and receive signals via wireless radios 801a-t and antennas 234a-t. The wireless radios 801a-t may include one or more components or devices described herein, such as the modulator/demodulators 232a-t, the MIMO detector 236, the receive processor 238, the transmit processor 220, the TX MIMO processor 230, one or more other components or devices, or a combination thereof.

In some examples, the base station 105 performs one or more operations described with reference to the first node 304. For example, the memory 242 may store beam change instruction logic 802 executable by the processor 240 to transmit the instruction 334 to perform the beam change operation 352 to the repeater node 340. In some implementations, the memory 242 may store indications of beam change delay time intervals 804, and the processor 240 may select the beam change delay time interval 344 from the beam change delay time intervals 804.

In some aspects, techniques for supporting beam changing by a repeater node may include additional aspects, such as any single aspect or any combination of aspects described below or in connection with one or more other processes or devices described elsewhere herein. In one or more aspects, an apparatus is configured to relay a first message using a first beam from a first node to a second node or from the second node to the first node. The apparatus is further configured to receive an instruction to perform a beam change operation from the first beam to a second beam. The apparatus is further configured to, after performing the beam change operation from the first beam to the second beam, relay, from one of the first node or the second node to the other of the first node or the second node, a second message using the second beam. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a first aspect, a method includes relaying a first message using a first beam. The first message is relayed from a first node to a second node or from the second node to the first node. The method further includes receiving an instruction to perform a beam change operation from the first beam to a second beam. The method further includes relaying, from one of the first node or the second node to the other of the first node or the second node, a second message using the second beam.

In a second aspect, alone or in combination with the first aspect, a beam change delay time interval associated with the beam change operation is associated with one or more of a first SCS of a first link associated with the repeater node and the first node, a second SCS of a second link associated with the repeater node and the second node prior to the beam change operation, or a third SCS of the second link after the beam change operation.

In a third aspect, alone or in combination with one or more of the first aspect or the second aspect, the first SCS is associated with a first beam change delay, the second SCS is associated with a second beam change delay, the third SCS is associated with a third beam change delay, and the beam change delay time interval is selected from among the first beam change delay, the second beam change delay, and the third beam change delay.

In a fourth aspect, alone or in combination with one or more of the first aspect through the third aspect, the method includes receiving a configuration message indicating a threshold beam change delay time interval associated with an SCS, where a beam change delay time interval associated with the beam change operation is less than or equal to the threshold beam change delay time interval.

In a fifth aspect, alone or in combination with one or more of the first aspect through the fourth aspect, the method includes transmitting a message indicating a beam change delay capability associated with the repeater node, and the threshold beam change delay time interval is associated with the beam change delay capability and with the SCS.

In a sixth aspect, alone or in combination with one or more of the first aspect through the fifth aspect, the threshold beam change delay time interval is based on a plurality of threshold beam change delay time intervals associated with a plurality of repeater nodes that includes the repeater node and at least one other repeater node.

In a seventh aspect, alone or in combination with one or more of the first aspect through the sixth aspect, the threshold beam change delay time interval is common to a plurality of repeater nodes that includes the repeater node and at least one other repeater node.

In an eighth aspect, alone or in combination with one or more of the first aspect through the seventh aspect, the method includes receiving a first DCI message, receiving a second DCI message, and forwarding the second DCI message to the first node or the second node. The first DCI message indicates a first beam change delay time interval associated with the repeater node, and the second DCI message indicates a second beam change delay time interval associated with the first node or the second node and that is less than the first beam change delay time interval, and the beam change operation is performed based on the first beam change delay time interval.

In a ninth aspect, alone or in combination with one or more of the first aspect through the eighth aspect, the first DCI message includes the instruction to perform the beam change operation.

In a tenth aspect, alone or in combination with one or more of the first aspect through the ninth aspect, the method includes transmitting a message indicating a beam change delay capability associated with the repeater node, where the beam change delay capability corresponds to a difference between the first beam change delay time interval and the second beam change delay time interval.

In an eleventh aspect, alone or in combination with one or more of the first aspect through the tenth aspect, the instruction is of a dynamic scheduling type that indicates to perform the beam change operation dynamically.

In a twelfth aspect, alone or in combination with one or more of the first aspect through the eleventh aspect, the instruction is of a semi-static scheduling type that indicates to perform the beam change operation semi-statically.

In a thirteenth aspect, alone or in combination with one or more of the first aspect through the twelfth aspect, the repeater node is in communication with multiple UEs, and each UE of the multiple UEs is associated with one or both of a respective beam or a respective scheduling type.

In a fourteenth aspect, alone or in combination with one or more of the first aspect through the thirteenth aspect, the instruction indicates to perform the beam change operation semi-statically according to a scheduling pattern associated with the multiple UEs.

In a fifteenth aspect, alone or in combination with one or more of the first aspect through the fourteenth aspect, the instruction is included in a DCI message, a MAC-CE, or an RRC signal.

In a sixteenth aspect, alone or in combination with one or more of the first aspect through the fifteenth aspect, the method includes, during a beam change delay time interval associated with the beam change operation, communicating using the first beam.

In a seventeenth aspect, alone or in combination with one or more of the first aspect through the sixteenth aspect, the method includes, during a beam change delay time interval associated with the beam change operation, buffering one or more messages from one of the first node or the second node, and after performing the beam change operation, transmitting the one or more messages to the other of the first node or the second node using the second beam.

In an eighteenth aspect, alone or in combination with one or more of the first aspect through the seventeenth aspect, the repeater node is included in a multi-hop network that includes at least a second repeater node, and a first beam change delay time interval associated with the repeater node is different than a second beam change delay time interval associated with the second repeater node.

In a nineteenth aspect, alone or in combination with one or more of the first aspect through the eighteenth aspect, the repeater node is included in a multi-hop network that includes at least a second repeater node, and a first scheduling associated with the repeater node is different than a second scheduling associated with the second repeater node.

In a twentieth aspect, alone or in combination with one or more of the first aspect through the nineteenth aspect, the first scheduling is one of a periodic type or a semi-static type, and the second scheduling is one of the periodic type or the semi-static type.

In a twenty-first aspect, alone or in combination with one or more of the first aspect through the twentieth aspect, the first scheduling is applied to first downlink transmit beams or first uplink receive beams associated with the repeater node, and the second scheduling is applied to second downlink transmit beams or second uplink receive beams associated with the second repeater node.

In a twenty-second aspect, alone or in combination with one or more of the first aspect through the twenty-first aspect, a repeater node includes a transmitter and a receiver configured to receive an instruction to perform a beam change operation from a first beam to a second beam. One or more of the transmitter or the receiver are configured to relay a first message using the first beam from a first node to a second node or from the second node to the first node and are further configured to relay, from one of the first node or the second node to the other of the first node or the second node, a second message using the second beam.

In a twenty-third aspect, alone or in combination with one or more of the first aspect through the twenty-second aspect, the repeater node and the first node are associated with a first link, and the first link corresponds to an access link or a fronthaul link.

In a twenty-fourth aspect, alone or in combination with one or more of the first aspect through the twenty-third aspect, the repeater node and the second node are associated with a second link, and the second link corresponds to a fronthaul link or an access link.

In a twenty-fifth aspect, alone or in combination with one or more of the first aspect through the twenty-fourth aspect, the first node corresponds to at least one of a UE a repeater node, a DU, a base station, a parent node, or a CU.

In a twenty-sixth aspect, alone or in combination with one or more of the first aspect through the twenty-fifth aspect, the second node corresponds to at least one of a UE, a repeater node, a DU, a base station, a parent node, or a CU.

In a twenty-seventh aspect, alone or in combination with one or more of the first aspect through the twenty-sixth aspect, a method includes receiving, from a second node via a repeater node, one or more signals associated with a change of position of the second node. The method further includes transmitting, to the repeater node, an instruction for the repeater node to perform a beam change operation associated with the change of position of the second node.

In a twenty-eighth aspect, alone or in combination with one or more of the first aspect through the twenty-seventh aspect, the instruction is of one of a dynamic scheduling type that indicates to perform the beam change operation dynamically or a semi-static scheduling type that indicates to perform the beam change operation semi-statically.

In a twenty-ninth aspect, alone or in combination with one or more of the first aspect through the twenty-eighth aspect, an apparatus for wireless communication. The apparatus includes a receiver configured to receive, via a repeater node from a second node, one or more signals associated with a change of position of the second node. The apparatus further includes a transmitter configured to transmit, to the repeater node, an instruction for the repeater node to perform a beam change operation associated with the change of position of the second node.

In a thirtieth aspect, alone or in combination with one or more of the first aspect through the twenty-ninth aspect, the instruction is of one of a dynamic scheduling type that indicates to perform the beam change operation dynamically or a semi-static scheduling type that indicates to perform the beam change operation semi-statically.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication by a repeater node, comprising:
   relaying a first message, using a first beam, from a first node to a second node or from the second node to the first node, the first message being associated with a change of position of the first node or the second node;
   receiving an instruction to perform a beam change operation from the first beam to a second beam, the instruction to perform the beam change operation being associated with the change of position; and
   relaying, from one of the first node or the second node to the other of the first node or the second node, a second message using the second beam.

2. The method of claim 1, wherein a beam change delay time interval associated with the beam change operation is associated with one or more of:
   a first subcarrier spacing (SCS) of a first link associated with the repeater node and the first node,
   a second SCS of a second link associated with the repeater node and the second node prior to the beam change operation, or
   a third SCS of the second link after the beam change operation.

3. The method of claim 2, wherein the first SCS is associated with a first beam change delay, wherein the second SCS is associated with a second beam change delay, wherein the third SCS is associated with a third beam change delay, and wherein the beam change delay time interval is selected from among the first beam change delay, the second beam change delay, and the third beam change delay.

4. The method of claim 1, further comprising receiving a configuration message indicating a threshold beam change delay time interval associated with a subcarrier spacing (SCS), wherein a beam change delay time interval associated with the beam change operation is less than or equal to the threshold beam change delay time interval.

5. The method of claim 4, further comprising transmitting a message indicating a beam change delay capability associated with the repeater node, wherein the threshold beam change delay time interval is associated with the beam change delay capability and with the SCS.

6. The method of claim 4, wherein the threshold beam change delay time interval is associated with a plurality of threshold beam change delay time intervals associated with a plurality of repeater nodes that includes the repeater node and at least one other repeater node.

7. The method of claim 4, wherein the threshold beam change delay time interval is common to a plurality of repeater nodes that includes the repeater node and at least one other repeater node.

8. The method of claim 1, further comprising:
   receiving a first downlink control information (DCI) message indicating a first beam change delay time interval associated with the repeater node;
   receiving a second DCI message indicating a second beam change delay time interval associated with the first node or the second node and that is less than the first beam change delay time interval; and
   forwarding the second DCI message to the first node or the second node,
   wherein the beam change operation is associated with the first beam change delay time interval.

9. The method of claim 8, wherein the first DCI message includes the instruction to perform the beam change operation.

10. The method of claim 8, further comprising transmitting a message indicating a beam change delay capability associated with the repeater node, wherein the beam change delay capability corresponds to a difference between the first beam change delay time interval and the second beam change delay time interval.

11. The method of claim 1, wherein the instruction is of a dynamic scheduling type that indicates to perform the beam change operation dynamically.

12. The method of claim 1, wherein the instruction is of a semi-static scheduling type that indicates to perform the beam change operation semi-statically.

13. The method of claim 1, further comprising, during a beam change delay time interval associated with the beam change operation, communicating using the first beam.

14. The method of claim 1, further comprising:
   during a beam change delay time interval associated with the beam change operation, buffering one or more messages from one of the first node or the second node; and
   after performing the beam change operation, transmitting the one or more messages to the other of the first node or the second node using the second beam.

15. A repeater node for wireless communication, comprising:
   a transmitter; and
   a receiver configured to receive an instruction to perform a beam change operation from a first beam to a second beam,
   wherein one or more of the transmitter or the receiver are configured to:
   relay a first message using the first beam from a first node to a second node or from the second node to the first node, the first message being associated with a change of position of the first node or the second node; and
   relay, from one of the first node or the second node to the other of the first node or the second node, a second message using the second beam, the instruction to perform the beam change operation being associated with the change of position.

16. The repeater node of claim 15, wherein the repeater node is in communication with multiple user equipments (UEs), and wherein each UE of the multiple UEs is associated with one or both of a respective beam or a respective scheduling type.

17. The repeater node of claim 16, wherein the instruction indicates to perform the beam change operation semi-statically according to a scheduling pattern associated with the multiple UEs.

18. The repeater node of claim 15, wherein the instruction is included in a downlink control information (DCI) message, a medium access control (MAC) control element (MAC-CE), or a radio resource control (RRC) signal.

19. The repeater node of claim 15, wherein the repeater node is included in a multi-hop network that includes at least a second repeater node, and wherein a first beam change delay time interval associated with the repeater node is different than a second beam change delay time interval associated with the second repeater node.

20. The repeater node of claim 15, wherein the repeater node is included in a multi-hop network that includes at least a second repeater node, and wherein a first scheduling associated with the repeater node is different than a second scheduling associated with the second repeater node.

21. The repeater node of claim 20, wherein the first scheduling is one of a periodic type or a semi-static type, and wherein the second scheduling is one of the periodic type or the semi-static type.

22. The repeater node of claim 20, wherein the first scheduling is applied to first downlink transmit beams or first uplink receive beams associated with the repeater node, and wherein the second scheduling is applied to second downlink transmit beams or second uplink receive beams associated with the second repeater node.

23. The repeater node of claim 15, wherein the repeater node and the first node are associated with a first link, wherein the first link corresponds to a first access link or a first fronthaul link, wherein the repeater node and the second node are associated with a second link, and wherein the second link corresponds to a second fronthaul link or a second access link.

24. The repeater node of claim 15, wherein at least one of the first node or the second node corresponds to at least one of:
    a user equipment (UE);
    a repeater node;
    a distributed unit (DU);
    a base station;
    a parent node; or
    a central unit (CU).

25. The repeater node of claim 15, wherein the first message indicates a selection of one or more beams.

26. The repeater node of claim 15, wherein the first message corresponds to a measurement report.

27. A method for wireless communication by a first node, comprising:
    receiving, from a second node via a repeater node, one or more signals associated with a change of position of the second node; and
    transmitting, to the repeater node, an instruction for the repeater node to perform a beam change operation associated with the change of position of the second node.

28. The method of claim 27, wherein the instruction is of one of a dynamic scheduling type that indicates to perform the beam change operation dynamically or a semi-static scheduling type that indicates to perform the beam change operation semi-statically.

29. An apparatus for wireless communication, comprising:
    a receiver configured to receive, via a repeater node from a second node, one or more signals associated with a change of position of the second node; and
    a transmitter configured to transmit, to the repeater node, an instruction for the repeater node to perform a beam change operation associated with the change of position of the second node.

30. The apparatus of claim 29, wherein the instruction is of one of a dynamic scheduling type that indicates to perform the beam change operation dynamically or a semi-static scheduling type that indicates to perform the beam change operation semi-statically.

* * * * *